US012747020B2

(12) United States Patent
Wygnanski et al.

(10) Patent No.: US 12,747,020 B2
(45) Date of Patent: Sep. 29, 2026

(54) HYBRID TILT PROPELLER/TILT WING AIRCRAFT

(71) Applicant: Arizona Board of Regents on Behalf of the University of Arizona, Tucson, AZ (US)

(72) Inventors: Israel Wygnanski, Tucson, AZ (US); Lutz Taubert, Tucson, AZ (US); Michael Ol, Pasadena, CA (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 164 days.

(21) Appl. No.: 18/213,046

(22) Filed: Jun. 22, 2023

(65) Prior Publication Data

US 2024/0132207 A1 Apr. 25, 2024
US 2024/0228031 A9 Jul. 11, 2024

Related U.S. Application Data

(60) Provisional application No. 63/354,667, filed on Jun. 22, 2022.

(51) Int. Cl.
*B64C 29/00* (2006.01)

(52) U.S. Cl.
CPC ................................ *B64C 29/0033* (2013.01)

(58) Field of Classification Search
CPC ............................ B64C 29/0033; B64C 29/00
See application file for complete search history.

(56) References Cited

U.S. PATENT DOCUMENTS 3,089,666 A * 5/1963 Quenzler ............ B64C 29/0033 244/66
6,655,631 B2 * 12/2003 Austen-Brown ...... B64D 25/00 244/12.4
10,513,332 B2 * 12/2019 Alber ..................... B64D 35/00
2018/0208305 A1 * 7/2018 Lloyd ..................... B60L 50/90
2019/0092445 A1 * 3/2019 Bailey ................. B64C 29/0033
2019/0100303 A1 * 4/2019 Campbell ............... B64C 27/26
2019/0375497 A1 * 12/2019 Baldwin ............... F16D 3/2052
2020/0023983 A1 * 1/2020 Moxon ................ B64D 27/357
2020/0180761 A1 * 6/2020 Sloan ...................... B64C 25/10
2021/0086897 A1 * 3/2021 Winston .............. B64C 29/0033
2022/0144421 A1 * 5/2022 Rimanelli ........... B64C 29/0033
2022/0388647 A1 * 12/2022 Ivans ...................... B64U 10/13
2023/0139693 A1 * 5/2023 Hofi ........................ B64U 10/10 701/3

* cited by examiner

*Primary Examiner* — Joshua J Michener
*Assistant Examiner* — Katherine June Walter
(74) *Attorney, Agent, or Firm* — BLANK ROME LLP

(57) ABSTRACT

This disclosure is directed to hybrid tilt propeller/tilt wing aircraft. The aircraft includes a fuselage, a first wing, and a second wing. The first wing and the second wing each include a fixed inner portion and an outer portion rotatably coupled to the inner portion. The aircraft includes a first propeller and a second propeller respectively associated with the first wing and the second wing and that can respectively rotate together with the outer portion of the associated wing. The aircraft includes an third wing and a third propeller mounted to the third wing. The third wing and the third propeller can rotate with respect to the fuselage. The aircraft can control movement in all directions without cyclic control of the first propeller, the second propeller, and the third propeller.

20 Claims, 2 Drawing Sheets

HYBRID TILT PROPELLER/TILT WING AIRCRAFT

CROSS-REFERENCE TO RELATED APPLICATIONS

The present application claims priority to U.S. provisional patent application 63/354,667, filed on Jun. 22, 2022, the entirety of which is incorporated herein by reference.

TECHNICAL FIELD

This disclosure is generally directed to the field of aviation, and more particularly to hybrid tilt propeller/tilt wing aircraft that can be controlled for movement in all directions without cyclic control of its rotors and/or propellers.

BACKGROUND

With modern air transportation emphasizing hub-to-hub long distance efficiency, passenger and cargo access to the hubs themselves remains a choke-point. High speed trains are a solution, subject to constraints of real-estate and funding. Helicopters are slow, expensive, and noisy, thus, limiting their appeal. The so-called electric vertical take-off and landing (VTOL) "air taxies", based on multi-copters and distributed electric propulsion address the noise problem and may replace some civilian helicopter applications. But such air taxies cannot compete with public transportation over longer ranges.

Distributed propulsion can allow wings to be attached to rotorcraft. Download, or efficiency-loss from rotor wake impingement on lifting surfaces, can be reduced via large booms on which multiple rotors can be mounted. Horizontal propulsion can be segregated from the vertical thrust needed for hover. Lifting-rotors are idle or being folded in cruise, with weight and drag penalties.

There are at least two general VTOL concepts combining propulsive systems for hover and cruise. One tilts the entire wing together with the propellers or rotors, while the other tilts the rotors with respect to an otherwise fixed wing. An example of the tiltrotor concept is the XV-15, the V-22 and the V-280 and an example of the tiltwing concept is the XC-142 and CL-84. The diameter of the tiltrotors is often large, because they are more efficient in hover and the rotor hub is located near the wingtip, while the propellers on the tiltwing are smaller, with emphasis on keeping the entire wing in the prop-wash. For example, the diameter of the XV-15 rotor can be 25 ft, while on the CL-84 the diameter is only 14 ft. The multi engine tiltwing concept is more efficient in cruise, while the twin engine tiltrotor concept can nominally take heavier load in hover due to its lower disc loading.

SUMMARY

The inventors recognized that there is a fundamental difficulty reconciling hover requirements with high-speed cruise, because, in hover, the thrust balances the total weight, while in cruise, the thrust balances the drag only that may typically account for only 5% of the weight. The inventors also recognized the need for an aircraft can be capable of taking off from a small space (e.g., a parking lot) in one location and landing in a small space in another location (e.g., a parking lot) that may be 1,500 km away in less than 3 hours. The inventors further recognized the need to improve upon the complex transition from hover to airplane mode in existing VTOL concepts. The inventors also recognized the need to reduce the mechanical complexity and costs associated therewith of existing rotorcraft.

These needs are met, to a great extent, by an aircraft according to some aspects of this invention. The aircraft includes a fuselage, a first wing, and a second wing. The first wing and the second wing each may include: an inner portion immovably fixed to the fuselage and extending from the fuselage, and an outer portion rotatably coupled to the inner portion and extending away from the inner portion to a tip of the respective wing. The aircraft also includes a first propeller between the inner portion of the first wing and the outer portion of the first wing. The first propeller is configured to rotate together with the outer portion of the first wing relative to the inner portion of the first wing. The aircraft also includes a second propeller between the inner portion of the second wing and the outer portion of the second wing. The second propeller is configured to rotate together with the outer portion of the second wing relative to the inner portion of the second wing. The aircraft also includes an empennage with a third wing and a third propeller mounted to the third wing. The third wing and the third propeller are configured to rotate together with respect to the fuselage. The aircraft is configured to control movement of the aircraft in all directions without cyclic control of the first propeller, the second propeller, and the third propeller.

Implementations may include one or more of the following features. In a takeoff configuration of the aircraft: the first propeller and the outer portion of the first wing are partially tilted up by a first takeoff angle relative to the fuselage, the second propeller and the outer portion of the second wing are partially tilted up by a second takeoff angle relative to the fuselage, and the third propeller and the third wing are tilted down and rearwards by a third takeoff angle relative to the fuselage. The term "takeoff angle" as used herein can mean an angle the propellers and portions of the wing are titled with respect to the fuselage. The first takeoff angle is measured from a longitudinal axis of the fuselage to a central axis of the first propeller, the second takeoff angle is measured from the longitudinal axis of the fuselage to a central axis of the second propeller, and the third takeoff angle is measured from the longitudinal axis of the fuselage to a central axis of the third propeller. The first takeoff angle and the second takeoff angle are each between 50° and 80°. The first takeoff angle and the second takeoff angle are a same magnitude. The third takeoff angle is between 45° and 100°. During takeoff the aircraft is configured to roll a distance of between a half of length of the aircraft and two lengths of the aircraft. In a cruising configuration of the aircraft: a central axis of the first propeller and the outer portion of the first wing are substantially parallel to a longitudinal axis of the fuselage, and a central axis of the second propeller and the outer portion of the second wing are substantially parallel to the longitudinal axis of the fuselage. In the cruising configuration of the aircraft, a central axis of the third propeller and the third wing are angled off the longitudinal axis of the fuselage to trim the aircraft. A first support is connected to and spans between the fuselage and the inner portion of the first wing, and a second support is connected to and spans between the fuselage and the inner portion of the second wing. The first propeller and the second propeller are configured for collective pitch control. The third propeller is configured for collective pitch control. The aircraft may include an active flow control system that is configured to actively control flow symmetrically or asymmetrically over each of the first wing and the second wing during flight to reduce flow separation. The active flow control system actively controls flow over the third wing during flight to reduce flow separation. Each of the inner portions may include a main segment that is immovably fixed and a flap that is configured to deflect relative to the main segment. The flap of each of the inner portions may include active flow control that is configured to minimize flow separation over the flap. The third wing is a channel wing and may include a semi-circular portion that defines a space that accommodates at least a portion of the third propeller. The empennage is rotatably mounted to the fuselage via booms that laterally extend rearwardly from the fuselage. Blades of each of the first propeller, the second propeller, and the third propeller are incapable of cyclic control. The inner portion is an inboard portion, and the outer portion is an outboard portion, and the outboard portion of each of the first wing and the second wing is tilted with respect to the respective first propeller of the first wing and the second propeller of the second wing.

Various additional features and advantages of this invention will become apparent to those of ordinary skill in the art upon review of the following detailed description of the illustrative embodiments taken in conjunction with the accompanying drawings.

BRIEF DESCRIPTION OF THE DRAWINGS

The following detailed description is better understood when read in conjunction with the appended drawings. For the purposes of illustration, examples are shown in the drawings; however, the subject matter is not limited to the specific elements and instrumentalities disclosed. In the drawings.

DETAILED DESCRIPTION

Figure 1:
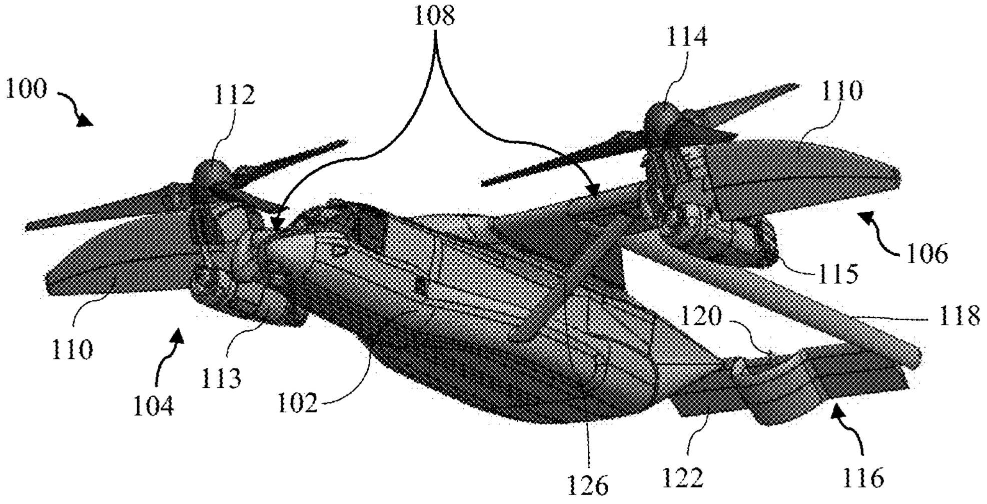
FIG. 1 shows a first perspective view of an aircraft according to some aspects of the invention.

This disclosure is generally directed to an aircraft that can include an outboard wing element that tilts with the propellers, active flow control (AFC) incorporated into the wings (e.g., an entirety of the wings), and/or an active channel wing empennage. In some embodiments, the aircraft can include a fuselage, an inboard wing that can be fixed relative to the fuselage, and a second wing that can tilt with the propeller. In some embodiments, more than one propeller can be provided on each wing, the tilt portion of the wing can be extended beyond the second propeller, and so on. The aircraft can include a gimbled (tilting) empennage with a third wing and a third propulsive system consisting of a single or multitude number of propellers mounted on it. The third wing and the third propeller can rotate together with respect to the fuselage. The aircraft can control movement of the aircraft in all directions without any motion of the propeller (rotor) blades.

In a takeoff configuration of the aircraft: the inboard propeller and the outer portion of the first wing can be tilted partially up by a first takeoff angle relative to the fuselage, the second propeller and the outer portion of the second wing can be tilted partially up by a second takeoff angle relative to the fuselage, and the third propulsive system comprising one or a multitude number of propellers and the third wing are tilted partially down or up depending on the location of the center of gravity by a third takeoff angle relative to the fuselage. The first takeoff angle can be measured from a longitudinal axis of the fuselage to a central axis of the first propeller, the second takeoff angle can be measured from the longitudinal axis of the fuselage to a central axis of the second propeller, and the third takeoff angle can be measured from the longitudinal axis of the fuselage to the chord of the third wing on which the multitude of propellers can be mounted. The first takeoff angle and the second takeoff angle can each be between 50° and 80°. The first takeoff angle and the second takeoff angle can be identical. The third takeoff angle can be between 45° and 100°. During takeoff the aircraft can roll a distance that is scaled by the aircraft length and it does not exceed one such length.

In a cruising configuration of the aircraft: a central axis of the first propeller and the outer portion of the first wing are substantially parallel to the longitudinal axis of the fuselage, and a central axis of the second propeller and the outer portion of the second wing are substantially parallel to the longitudinal axis of the fuselage. In the cruising configuration of the aircraft, a central axis of the third propulsive system and the third wing are angled off the longitudinal axis of the fuselage to trim the aircraft. A first support strut can be connected to and can span between the bottom of the fuselage and the inner portion of the first wing, the first propeller and the second propeller can be configured for collective pitch control. The third propeller can be configured for collective pitch control. The aircraft can include an active flow control system that can actively control flow symmetrically over each of the first wing and the second wing during takeoff to reduce flow separation and provide a suck-back force to counteract the thrust component of the partially tilted propellers. The active flow control system can actively control flow over the third wing during flight to reduce flow separation. Asymmetric flow control using the active flow control system can provide yaw control.

Each of the inner portions may include a main segment that can be immovably fixed and a flap that can be configured to deflect relative to the main segment. The flap of each of the inner portions can include active flow control that can minimize flow separation over the flap. The third wing can be a channel wing and can include a semi-circular portion that defines a space that accommodates at least a portion of a third propeller. The empennage can be rotatably mounted to the fuselage via booms that laterally extend rearwardly from the fuselage. Blades of each of the first propeller, the second propeller, and the third propeller can be incapable of cyclic control.

The wing according to some aspects of the invention can include two segments: a segment inboard of the nacelle that is rigidly attached to the fuselage; and an outboard segment that rotates with the engine nacelle portion that tilts with the propeller. The inboard wing can have an k-shape with a trailing edge (TE) crank coinciding with the inboard edge of the propeller wake. Thus, in embodiments the enlarged inboard wing-chord does not contribute to download while separating further the two propellers of the aircraft and providing volume for fuel. The increased propeller separation can increase total thrust in hover by reducing propeller interference.

According to some aspects of the invention, the aircraft can include twin booms that can allow for a variety of AFC-augmented empennages that may include vertical or inclined stabilizers. Boom length and spanwise separation can be provided in a number of configurations.

According to some aspects of the invention, an empennage of the aircraft can include a channel-wing with a propeller (single or co-axial counter rotating). The efficiency of the propeller can be unimpeded by the channel wing due to a semi-circular enclosure that can generate substantial lift. The channel wing can be gimbled. A gimbled channel-wing empennage can subtract from the hover thrust, thus providing substantial suck-back force that can maintain hover with partially tilted propellers. The empennage can provide trim and control pitch throughout the flight envelope, which can eliminate the need for cyclic rotor control and thereby substantially reduce the mechanical complexity of the aircraft. The channel wing can be tilted to provide trim in a cruising configuration of the aircraft. The empennage together with an AFC-augmented tilt wing can eliminate the need for edgewise flight (and thus eliminate the need for cyclic control and reduce loads on rotors/propellers significantly) during transition from steep climb to cruise. According to some aspects of the invention, the location and shape of the fuselage loading ramp can utilize the suction provided by the propeller and the channel-wing of the empennage, which can eliminate or reduce separation on the ramp and thus fuselage-based drag.

According to some aspects of the invention, the weight of the outer wing can reduce the root bending moment as compared to conventional VTOL aircraft, and a support (e.g., a strut) connecting the wing-spar to the bottom of the sponsons can alleviate some of the wing load. The distance between the TE crank and the nacelle can be a function of the propeller diameter and it can assure that the increased chord is outside of the propeller's wake. The aspect ratio of the entire wing can exceed 8, which can increase the distance between the propeller hubs and improve the propeller's figure of merit (FM) as compared to conventional tilt rotor VTOL aircraft.

According to some aspects of the invention, the entirety of the wings of the aircraft can include AFC-augmented simple (not slotted) flaps. AFC can reduce the download by maintaining attached flow at larger flap deflection than otherwise possible. AFC can also increase the suck-back force and thus enable a larger forward tilt of the rotors and further reduction in download as compared to conventional tilt rotor VTOL aircraft.

According to some aspects of the invention, yaw can be controlled by differential application of AFC to the outboard wing panels. The net effect can be reversed between cruise and steep climb, depending on the outboard wing attitude. The tilting outboard wing can be set at an incidence relative to the thrust axis, and a change in that angle could also be used for roll control. The application of AFC on such a wing in cruise can provide yaw push the wing forward by providing added thrust, while similar application on a tilted wing in prop-wash in hover generates lift resulting in suck-back. AFC can be advantageous to yaw & roll in cruise because the thrust added can improve lift thus providing a coordinated turn.

According to some aspects of the invention, only the outboard portion of the wing, together with the propellers, is tilted. The inboard wings can be braced with a diagonal strut that terminates just inboard of the tilt-point to provide for a higher aspect ratio wing than traditional tilt rotor VTOL aircraft. The need for rotor cyclic control can be obviated with a high control-authority empennage that is robust in hover. The AFC can reduce download and high angle of attack separation. A combination of wing borne-transition at lower speeds, flow-turning through the propellers via wing-propeller interaction, and AFC can alleviate load issues due to edge flight. In short, the aircraft can balance the horizontal forces at finite propeller tilt to enable hover at larger efficiency and cruise at higher lift to drag ratios than conventional tilt rotor VTOL aircraft. These and some other aspects of the invention are applicable to and described further later in reference to FIGS. 1-4.

Figure 2:
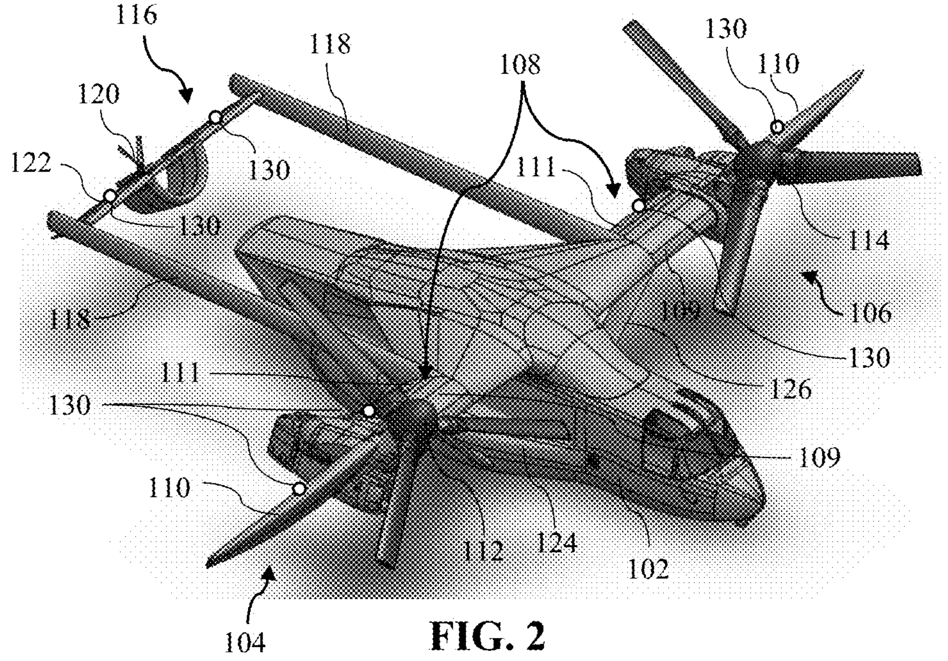
FIG. 2 shows a second perspective view of the aircraft of FIG. 1.

FIG. 1 shows a perspective view of an aircraft 100 according to some aspects of the invention. FIG. 2 shows another perspective view of the aircraft 100. The aircraft 100 can include a fuselage 102. The aircraft 100 can include a first wing 104 and a second wing 106 that respectively extend in opposite directions away from the fuselage 102. In embodiments, the first wing 104 and the second wing 106 can extend longitudinally away from the fuselage 102 in directions generally perpendicular to a longitudinal axis $A_{102}$ of the fuselage 102.

The first wing 104 and the second wing 106 can each respectively include a number of similar sub-structures. For example, the first wing 104 and the second wing 106 can each respectively include an inner portion 108 (i.e., an inboard portion). Each of the inner portions 108 can be immovably and fixed to the fuselage 102 and extend form the fuselage 102. In alternative embodiments, such as for example some naval applications where the aircraft 100 can enter an elevator, the entire first wing 102 and second wing 104, including the inner portions 108, can rotate around a vertical axis and becomes aligned with axis $A_{102}$ for storage purposes. Each of the inner portions can include a main segment 109 that is immovably fixed to the fuselage 102 and a flap 111 that can deflect relative to the main segment 109. For example, the flap 111 can deflect downwards relative to the main segment 109 when the aircraft is in the takeoff configuration. The first wing 104 and the second wing 106 can each respectively include an outer portion 110 (e.g., an outboard portion). Each of the outer portions 110 can be rotatably coupled to its respective inner portion 108. Each of the outer portions 110 can extend away from the respective inner portion 108 to a tip of each of the respective first wing 104 and second wing 106.

The aircraft 100 can include a first propeller 112 and a second propeller 114. In embodiments, the second propeller 114 can rotate about its central axis clockwise relative to an observer in the cockpit and the first propeller 112 can rotate counter-clockwise about its central axis $A_{112}$. The first propeller 112 and the second propeller 114 can also rotate to "tilt" the respective central axis (e.g., axis $A_{112}$) together with the outer portions 110 for takeoff and landing. The first propeller 112 and the second propeller 114 can tilt forward for cruise and, in embodiments, can fold entirely such as for example when a third propeller 120 on the empennage 116 (described below) provides sufficient thrust. The first propeller 112 can be between the inner portion 108 of the first wing 104 and the outer portion 110 of the first wing 104. The first propeller 112 can rotate together with the outer portion 110 of the first wing 104 relative to, for example, the inner portion 108 of the first wing 104 and the fuselage 102. The second propeller 114 can be between the inner portion 108 of the second wing 106 and the outer portion 110 of the second wing 106. The second propeller 114 can rotate together with the outer portion 110 of the second wing 106 relative to, for example, the inner portion 108 of the second wing 106 and the fuselage 102. The aircraft 100 can include a first engine 113 operatively connected to the first propeller 112 that drives the first propeller 112. In embodiments, the first engine 113 can be fixed to the inner portion 108 of the first wing 104 and the first propeller 112 can rotate relative to the first engine 113 or alternatively the first engine 113 can be fixed to the outer portion 110 of the first wing 104 and the first propeller 112 and the first engine 113 can rotate together. The aircraft 100 can include a transmission that transmits power from the first engine 113 to the first propeller 112 regardless of the state of rotation of the first propeller 112. The aircraft 100 can include a second engine 115 operatively connected to the second propeller 114 that drives the second propeller 114. In embodiments, the second engine 115 can be fixed to the inner portion 108 of the first wing 104 and the second propeller 114 can rotate relative to the second engine 115 or alternatively the second engine 115 can be fixed to the outer portion 110 of the second wing 106 and the second propeller 114 and the second engine 115 can rotate together. The aircraft 100 can include a transmission that transmits power from the second engine 115 to the second propeller 114 regardless of the state of rotation of the second propeller 114.

The aircraft 100 can include an empennage 116. The empennage 116 can be rotatably fixed to the fuselage 102. For example, in embodiments the aircraft 100 can include booms 118 that extend rearwardly from the fuselage 102. The empennage 116 can be rotatably fixed to first ends of the booms 118 so as to be tiltable or pivotable with respect to the booms 118. Second ends of the booms 118 can be fixed either directly or indirectly to the fuselage 102. In embodiments, the second ends of the booms 118 can be fixed to the inner portions 108 of the first wing 104 and the second wing 106. The empennage 116 can include a third propeller 120 (simple or counter rotating) or a number of third propellers 120. The third propeller 120 can rotate relative to the fuselage 102 to provide, for example, pitch control, lift, thrust, among other possibilities. In embodiments, the empennage 116 can include a third wing 122. The third wing 122 can rotate relative to the fuselage 102 to provide for example pitch control, thrust or suck-back as well as lift, among other possibilities. In embodiments, the third propeller 120 can be fixedly mounted onto the third wing 122 and can rotate together with the third wing 122. In embodiments, the third wing 122 can be a channel wing. In embodiments, the third wing 122 can be a straight wing. In embodiments, the third wing 122 can be a straight wing and can include multiple third propellers 120. In embodiments, the third wing 122 can include a semi-circular portion(s) that can accommodate the third propeller(s) 120 within a space defined by the semi-circular portion.

The aircraft 100 can control movement of the aircraft 100 in all directions without using cyclic control or cyclic control of the blades of the first propeller 112, the second propeller 114, or the third propeller 120. The third propeller 120 can pivot with the third wing 122 to provide pitch control. Control in hover and at low speed can be provided by the three propellers 112, 114, 120 and the active flow control system (described later). In cruise the aircraft is controlled in a conventional manner by deflecting control surfaces (such as flaperons). The aircraft 100 can control movement of the aircraft 100 using for example, by controlling rotation of the flaps 111, the outer portions 110 together with their respective first propeller 112 and second propeller 114, rotation of the third wing 122 together with the third propeller 120, with active flow control 130 (described later), among other possibilities. But the controller does not utilize cyclic control of any and all of the first propeller 112, the second propeller 114, or the third propeller 112 for directional control for directional control of the aircraft 100.

Each of the first propeller 112, the second propeller 114, and the third propeller 120 can be incapable of cyclic control. That is, each of the first propeller 112, the second propeller 114, and the third propeller 120 can be mechanically incapable of changing the pitch of their respective blades independently from the other respective blades of a given propeller. For example, the first propeller 112 can include three blades, though other blade numbers are possible based on for example the weight of the aircraft 100 and the total thrust of its engines. In embodiments, a pitch angle of each of the blades of the first propeller 112 can be changed collectively. That is, each of the blades of the first propeller 112 can pivot together to change the pitch angle of each of the blades by the same magnitude. In alternative embodiments, the pitch angle of each of the blades of the first propeller 112 can be fixed. In either case, since the first propeller 112 is incapable of cyclic control, the first propeller 112 is incapable of being controlled to independently change the pitch angle of any individual blade relative to the other blades of the first propeller 112. The second propeller 114 and the third propeller 120 can function in a similar manner. That is, the second propeller 114 and the third propeller 120 can in embodiments change the pitch angle of each of their respective blades collectively. In alternative embodiments, the second propeller 114 and the third propeller 120 can include blades with pitch angles that are fixed. In either case, the second propeller 114 and the third propeller 120 can be incapable of being controlled to independently change the pitch angle of any their individual blades relative to the other blades of the respective propeller. The aircraft 100 equipped with the first propeller 112, the second propeller 114, and the third propeller 120 that are each incapable of cyclic control can be advantageous by reducing the mechanical and control complexity of the first propeller 112, the second propeller 114, and the third propeller 120. This can make manufacture and maintenance of the aircraft 100 significantly easier and reduce costs associated with manufacturing and producing the aircraft 100.

Figure 3:
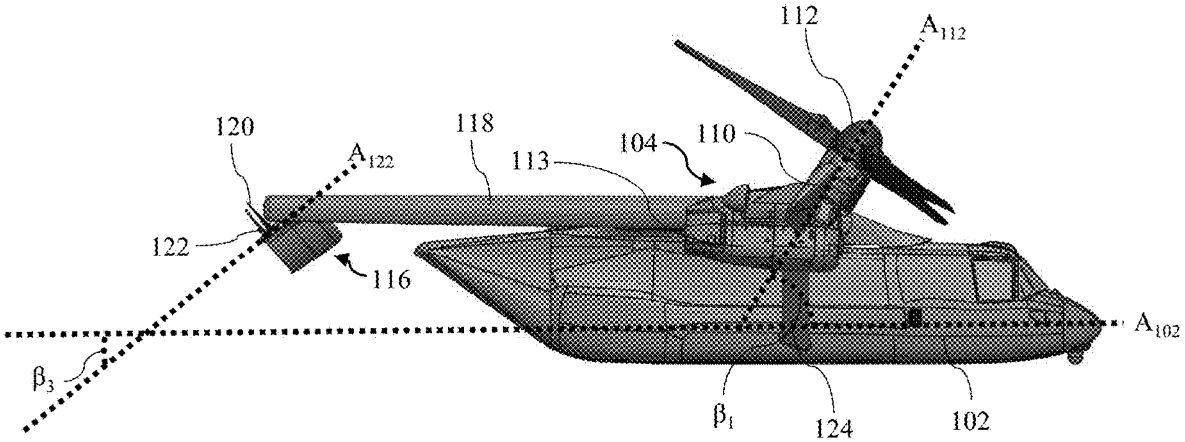
FIG. 3 shows a side view of the aircraft of FIG. 1 in a takeoff configuration.

The aircraft 100 can selectively transition between a takeoff configuration and a cruising configuration, though other configurations are possible. FIG. 3 shows a side view of the aircraft 100 in the takeoff configuration according to some aspects of the invention. In the takeoff configuration, the aircraft 100 can takeoff the ground from a standstill after rolling a short distance, i.e., the aircraft 100 can be capable of super short takeoff (SSTO). For example, in some embodiments the aircraft 100 can takeoff from the ground from a standstill after rolling a distance of less than two lengths of the aircraft 100, less than one length of the aircraft 100, between half and two lengths of the aircraft 100, between half and one length of the aircraft 100, among other possibilities. SSTO can increase the payload capacity of the aircraft as compared to true hovering aircraft but still enable the aircraft to take off in super short distances. This can enable the aircraft 100 to be used in environments without long-run ways or without traditional runways and thereby improve the versatility of the aircraft 100.

In the takeoff configuration, the first propeller 112 and the outer portion 110 of the first wing 104 are tilted up by a first takeoff angle $\beta_1$ relative to the fuselage 102. The first takeoff angle $\beta_1$ can be measured from the longitudinal axis $A_{102}$ of the fuselage 102 to a central axis $A_{112}$ of the first propeller 112 when viewed two-dimensionally from a side of the aircraft 100, as shown in FIG. 3. Though obscured by the first wing 104 in FIG. 3, in the takeoff configuration the second propeller 114 and the outer portion 110 of the second wing 106 can also be tilted up by a second takeoff angle relative to the fuselage 102. Like the first takeoff angle $\beta_1$, the second takeoff angle can be measured from the longitudinal axis $A_{102}$ of the fuselage 102 to a central axis of the second propeller 114 when viewed two dimensionally from the other side of the aircraft 100. In the takeoff configuration, the third propeller 120 and the third wing 122 can be tilted down together by a third takeoff angle (33 relative to the fuselage 102. The third takeoff angle $\beta_3$ can be measured from the longitudinal axis $A_{102}$ of the fuselage 102 to a central axis $A_{122}$ of the third propeller 120 when viewed two-dimensionally from a side of the aircraft 100, as shown in FIG. 3. In embodiments, the first takeoff angle $\beta_1$ and the second takeoff angle can each be between 50° and 80°, between 60° and 75°, among other possibilities. Takeoff angles within this range can be advantageous by balancing the interests of minimizing takeoff rolling distance against maximizing the payload of the aircraft 100. Takeoff angles within this range can also be advantageous by reducing or eliminating fountain flow above the fuselage that is centered at the plane of symmetry. In embodiments, the first takeoff angle $\beta_1$ and the second takeoff angle can be of the same magnitude or alternatively of different magnitudes. In embodiments, the third takeoff angle $\beta_3$ can be between 45° and 100°, which can enable fine tuning of suck-back force and trimming of the aircraft 100. Other third takeoff angles outside this range are possible. In embodiments, the third takeoff angle $\beta_3$ can be of the same magnitude as the first takeoff angle $\beta_1$ and/or the second takeoff angle or alternatively can be a different magnitude than the first takeoff angle $\beta_1$ and/or the second takeoff angle.

Figure 4:
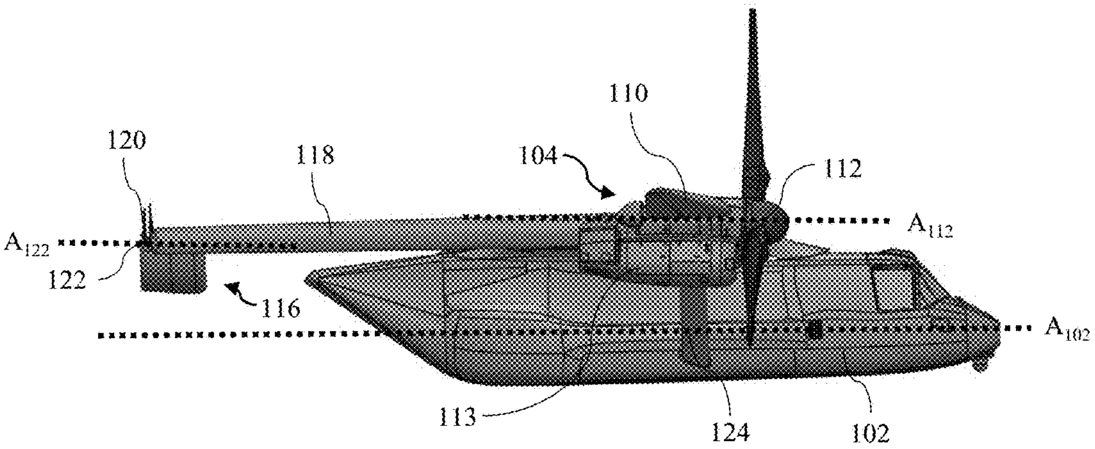
FIG. 4 shows a side view of the aircraft of FIG. 1 in a cruising configuration.

FIG. 4 shows a side view of the aircraft 100 in the cruising configuration, according to some aspects of the invention. In the cruising configuration, the central axis $A_{112}$ of the first propeller 112 and the outer portion 110 of the first wing 104 can be substantially parallel to the longitudinal axis $A_{102}$ of the fuselage 102. In the cruising configuration, the central axis of the second propeller 114 and the outer portion 110 of the second wing 106 can be substantially parallel to the longitudinal axis $A_{102}$ of the fuselage 102. According to this configuration, all or a substantial majority of the thrust generated by the first propeller 112 and the second propeller 114 can be directed parallel to the longitudinal axis $A_{102}$ of the fuselage 102 which can be advantageous for maximizing speed. In embodiments, in the cruising configuration the central axis $A_{122}$ of the third propeller 120 and the third wing 122 can be slightly angled off (e.g., angled slightly forward) to the longitudinal axis $A_{102}$ of the fuselage 102. According to this configuration, a substantial majority of the thrust generated by the third propeller 120 can be directed parallel to the longitudinal axis $A_{102}$ of the fuselage 102 which can be advantageous for maximizing a speed that the aircraft 100 travels and a slight tilt can trim the aircraft 100. The aircraft 100 can operate in configurations other than the takeoff configuration or the cruising configuration. For example, the angles of the first propeller 112 and its associated outer portion 110, the second propeller 114 and its associated outer portion 110, the third propeller 120 and the third wing 122 relative to the longitudinal axis $A_{102}$ of the fuselage 102 can be varied to control the direction and/or altitude of the aircraft 100.

In embodiments, the aircraft 100 can include a first support 124 and a second support 126. The first support 124 can be fixed to the fuselage 102 and the inner portion 108 of the first wing 104 and can span between the fuselage 102 and the inner portion 108 of the first wing 104. The second support 126 can be fixed to the fuselage 102 and the inner portion 108 of the second wing 106 and can span between the fuselage 102 and the inner portion 108 of the second wing 106. The first support 124 and the second support 126 can bear at least a portion of the weight associated with and the forces exerted on the respective first wing 104 and second when 106. According to this configuration, and aspect ratio of the first wing 104 and the second wing 106 can be greater than would otherwise be possible without the first support 124 and the second support 126.

As shown schematically in FIG. 2, the aircraft 100 can include active flow control 130. The active flow control 130 can include compressors that compress air and supply the compressed air to jet actuators on flaps of the respective wings, among other possibilities. In embodiments, the jet actuators can each include an individual shutoff valve. In embodiments, the active flow control 130 can maintain attached flow at flap angles between 45° and 75°, though other angles outside this range are possible. The active flow control 130 can reduce download by maintaining attached flow at larger wing flap deflection than would otherwise be possible without the active flow control 130 the active flow control 130 can also increase the suck-back force, which can enable a larger forward tilt of any of the propellers associate with the wing having the active flow control 130. The active flow control 130 can reduce flow separation along any of the wing surfaces upon which the active flow control 130 is provided. The active flow control 130 can be provided symmetrically on any or all of the first wing 104, the second wing 106, and the third wing 122. For example, in embodiments active flow control 130 can be provided symmetrically on any or all of the flaps 111 of the inner portions 108 of the first wing 104 and/or the second wing 106, the outer portions 110 of the first wing 104 and/or the second wing 106, and on the third wing 122. Active flow control 130 can be distributed symmetrically along the length of any or all of the first wing 104, the second wing 106, and the third wing 122. In embodiments, the active flow control 130 can reduce download by approximately 30% as compared to an aircraft without the active flow control 130. Slight deviations from the symmetry of the applied AFC can be used to control the aircraft 100.

It will be appreciated that the foregoing description provides examples of the invention. However, it is contemplated that other implementations of the invention may differ in detail from the foregoing examples. All references to the invention or examples thereof are intended to reference the particular example being discussed at that point and are not intended to imply any limitation as to the scope of the invention more generally. All language of distinction and disparagement with respect to certain features is intended to indicate a lack of preference for those features, but not to exclude such from the scope of the invention entirely unless otherwise indicated.

What is claimed is:

1. An aircraft comprising:

a fuselage;

a first wing and a second wing, the first wing and the second wing each comprising:

an inner portion immovably fixed to the fuselage and extending from the fuselage; and an outer portion rotatably coupled to the inner portion and extending away from the inner portion to a tip of the respective wing;

a first propeller between the inner portion of the first wing and the outer portion of the first wing, wherein the outer portion of the first wing extends beyond the first propeller to the tip of the first wing, the first propeller being configured to rotate together with the outer portion of the first wing relative to the inner portion of the first wing;

a second propeller between the inner portion of the second wing and the outer portion of the second wing, wherein the outer portion of the second wing extends beyond the second propeller to the tip of the second wing, the second propeller being configured to rotate together with the outer portion of the second wing relative to the inner portion of the second wing; and an empennage comprising a third wing and a third propeller mounted to the third wing, wherein the third wing and the third propeller are configured to rotate together with respect to the fuselage, wherein the aircraft is configured to control movement of the aircraft in all directions without cyclic control of the first propeller, the second propeller, and the third propeller, and wherein the third wing is a channel wing comprising a semi-circular portion that defines a space that accommodates at least a portion of the third propeller.

2. The aircraft of claim 1, wherein in a takeoff configuration of the aircraft:

the first propeller and the outer portion of the first wing are partially tilted up and by a first takeoff angle relative to the fuselage, the second propeller and the outer portion of the second wing are partially tilted up by a second takeoff angle relative to the fuselage, and the third propeller and the third wing are tilted down and rearwards by a third takeoff angle relative to the fuselage.

3. The aircraft of claim 2, wherein:

the first takeoff angle is measured from a longitudinal axis of the fuselage to a central axis of the first propeller, the second takeoff angle is measured from the longitudinal axis of the fuselage to a central axis of the second propeller, and the third takeoff angle is measured from the longitudinal axis of the fuselage to a central axis of the third propeller.

4. The aircraft of claim 3, wherein the first takeoff angle and the second takeoff angle are each between 50° and 80°.

5. The aircraft of claim 4, wherein the first takeoff angle and the second takeoff angle are a same magnitude.

6. The aircraft of claim 5, wherein the third takeoff angle is a magnitude that is different that the magnitude of the first and second takeoff angles.

7. The aircraft of claim 1, wherein, during takeoff the aircraft is configured to roll a distance of between a half of length of the aircraft and two lengths of the aircraft.

8. The aircraft of claim 1, wherein in a cruising configuration of the aircraft:

a central axis of the first propeller and the outer portion of the first wing are substantially parallel to a longitudinal axis of the fuselage, and a central axis of the second propeller and the outer portion of the second wing are substantially parallel to the longitudinal axis of the fuselage.

9. The aircraft of claim 8, wherein in the cruising configuration of the aircraft a central axis of the third propeller and the third wing are angled off the longitudinal axis of the fuselage to trim the aircraft.

10. The aircraft of claim 1, further comprising a first support and a second support, wherein the first support is connected to and spans between the fuselage and the inner portion of the first wing, and the second support is connected to and spans between the fuselage and the inner portion of the second wing.

11. The aircraft of claim 1, wherein the first propeller, the second propeller, and the third propeller are configured for collective pitch control.

12. The aircraft of claim 1, further comprising an active flow control system that is configured to actively control flow symmetrically or asymmetrically over each of the first wing and the second wing during flight to reduce flow separation.

13. The aircraft of claim 12, wherein the active flow control system actively controls flow over the third wing during flight to reduce flow separation.

14. The aircraft of claim 1, wherein:

each of the inner portions comprises a main segment that is immovably fixed and a flap that is configured to deflect relative to the main segment, and the flap of each of the inner portions comprises active flow control that is configured to minimize flow separation over the flap.

15. The aircraft of claim 1, wherein the empennage is rotatably mounted to the fuselage via booms that laterally extend rearwardly from the fuselage.

16. The aircraft of claim 1, wherein blades of each of the first propeller, the second propeller, and the third propeller are incapable of cyclic control.

17. An aircraft comprising:

a fuselage;

a first wing and a second wing, the first wing and the second wing each comprising:

an inner portion immovably fixed to the fuselage and extending from the fuselage, the inner portion is an inboard portion; and an outer portion rotatably coupled to the inner portion and extending away from the inner portion to a tip of the respective wing, the outer portion is an outboard portion;

a first propeller between the inner portion of the first wing and the outer portion of the first wing, wherein the outer portion of the first wing extends beyond the first propeller to the tip of the first wing, the first propeller being configured to rotate together with the outer portion of the first wing relative to the inner portion of the first wing;

a second propeller between the inner portion of the second wing and the outer portion of the second wing, wherein the outer portion of the second wing extends beyond the second propeller to the tip of the second wing, the second propeller being configured to rotate together with the outer portion of the second wing relative to the inner portion of the second wing; and an empennage comprising a third wing and a third propeller mounted to the third wing, wherein the third wing and the third propeller are configured to rotate together with respect to the fuselage, wherein the aircraft is configured to control movement of the aircraft in all directions without cyclic control of the first propeller, the second propeller, and the third propeller, and wherein the outboard portion of each of the first wing and the second wing is tilted with the respective first propeller of the first wing and the second propeller of the second wing.

18. The aircraft of claim 12, wherein the active flow control system is provided on each of the outer portions of the first and second wings.

19. The aircraft of claim 1, wherein each of the outer portions of the first and second wings has a weight, the weight of the outer portions being a counterbalance configured to reduce a root bending moment.

20. An aircraft comprising:

a fuselage;

a first wing and a second wing, the first wing and the second wing each comprising:

an inner portion immovably fixed to the fuselage and extending from the fuselage;

an outer portion rotatably coupled to the inner portion and extending away from the inner portion to a tip of the respective wing;

a first propeller between the inner portion of the first wing and the outer portion of the first wing, the first propeller being configured to rotate together with the outer portion of the first wing relative to the inner portion of the first wing;

a second propeller between the inner portion of the second wing and the outer portion of the second wing, the second propeller being configured to rotate together with the outer portion of the second wing relative to the inner portion of the second wing; and an empennage comprising a third wing and a third propeller mounted to the third wing, wherein the third wing and the third propeller are configured to rotate together with respect to the fuselage, wherein the aircraft is configured to control movement of the aircraft in all directions without cyclic control of the first propeller, the second propeller, and the third propeller, and wherein the third wing is a channel wing comprising a semi-circular portion that defines a space that accommodates at least a portion of the third propeller.

* * * * *